United States Patent
McPheeters (10) Patent No.: US 9,439,505 B2
(45) Date of Patent: Sep. 13, 2016

(54) SUPPORT STRUCTURES FOR HANGING EQUIPMENT

(71) Applicant: Greg McPheeters, Santa Clara, CA (US)

(72) Inventor: Greg McPheeters, Santa Clara, CA (US)

(73) Assignee: MOVED BY BIKES LLC, Santa Cruz, CA (US)

( * ) Notice: Subject to any disclaimer, the term of this patent is extended or adjusted under 35 U.S.C. 154(b) by 0 days.

(21) Appl. No.: 13/889,340

(22) Filed: May 7, 2013

(65) Prior Publication Data

US 2013/0291416 A1 Nov. 7, 2013

Related U.S. Application Data

(60) Provisional application No. 61/643,833, filed on May 7, 2012.

(51) Int. Cl.
*G09F 15/00* (2006.01)
*A47B 47/00* (2006.01)
*B62H 3/00* (2006.01)
*E04G 1/32* (2006.01)

(52) U.S. Cl.
CPC ............ *A47B 47/00* (2013.01); *B62H 3/00* (2013.01); *E04G 1/32* (2013.01); *G09F 15/00* (2013.01)

(58) Field of Classification Search
CPC ............ A47F 5/13; B25H 1/04; E04G 1/32; E04G 1/34; E04G 1/36; F16M 11/24; A47B 13/021; A47B 2200/0016; A63B 5/12; E06C 1/3835; E06C 9/085; E06C 1/20; E06C 7/423
USPC ............ 40/610; 248/163.1–440.1, 164; 182/160, 186.4, 186.5
See application file for complete search history.

(56) References Cited

U.S. PATENT DOCUMENTS

| | | | | |
|---|---|---|---|---|
| 494,358 A * | 3/1893 | Weeks | | E06C 1/10 182/151 |
| 1,462,707 A * | 7/1923 | Lawlor | | E04G 1/32 182/186.4 |
| 1,955,772 A * | 4/1934 | Roth | | 211/172 |
| 2,427,841 A * | 9/1947 | Dichter | | 403/109.3 |
| 2,698,771 A * | 1/1955 | O'Rourk | | B25G 1/06 182/151 |
| 2,788,598 A * | 4/1957 | Surber | | 428/8 |
| 2,806,723 A * | 9/1957 | Fairclough | | 403/104 |
| 2,957,669 A * | 10/1960 | Berlin | | A47G 25/0664 248/121 |
| 3,021,755 A * | 2/1962 | Karchenes | | 248/472 |
| 3,330,534 A * | 7/1967 | Collins | | E01F 13/02 182/181.1 |
| 3,503,582 A * | 3/1970 | Boucher | | 248/370 |
| 3,704,849 A * | 12/1972 | Green | | 248/165 |
| 3,777,428 A * | 12/1973 | Caufield | | 52/146 |
| 3,814,416 A * | 6/1974 | Munger | | A63B 9/00 182/151 |
| 3,839,754 A * | 10/1974 | Hooper | | 5/98.2 |
| 3,993,088 A * | 11/1976 | Thomas | | 135/67 |
| 4,375,134 A * | 3/1983 | Sheetz | | 40/591 |
| 4,804,064 A * | 2/1989 | Coultrup | | B25H 1/06 182/155 |
| 4,817,319 A * | 4/1989 | Vitale | | 40/610 |
| 4,919,368 A * | 4/1990 | Garrett | | 248/121 |

(Continued)

*Primary Examiner* — Cassandra Davis
(74) *Attorney, Agent, or Firm* — Kramer Levin Naftalis & Frankel LLP (57) ABSTRACT

Described herein is a new assembly of components which comprise a support structure for hanging or supporting bicycles or similar equipment. The rack is designed using a number of tubes that pack into themselves for an extremely compact, lightweight assembly which is very easy to transport and store. The simple design ensures long term reliability and ease of use.

12 Claims, 6 Drawing Sheets

(56) References Cited

U.S. PATENT DOCUMENTS

| | | | |
|---|---|---|---|
| D314,828 S * | 2/1991 | Lanier | D25/67 |
| 5,377,779 A * | 1/1995 | Slapnicka | E04G 1/34 |
| | | | 182/153 |
| 5,551,178 A * | 9/1996 | Foley et al. | 40/610 |
| 5,638,918 A * | 6/1997 | Hebda | E06C 1/39 |
| | | | 182/129 |
| 6,161,807 A * | 12/2000 | Steiner et al. | 248/166 |
| 6,564,489 B1 * | 5/2003 | Bader | 40/610 |
| 6,643,966 B2 * | 11/2003 | Schmitt | 40/610 |
| 7,185,861 B2 * | 3/2007 | LaMotte | 248/165 |
| 8,122,629 B2 * | 2/2012 | Cowgill | 40/610 |

* cited by examiner

SUPPORT STRUCTURES FOR HANGING EQUIPMENT

CROSS-REFERENCE TO RELATED APPLICATIONS

This application claims the benefit of U.S. Provisional Application No. 61/643,833, filed May 7, 2012, which is incorporated by reference herein in its entirety.

BACKGROUND OF THE DISCLOSURE

Event racks for storage of equipment, such as bicycles and other devices are becoming increasingly in demand as more and more people use bicycles for transportation and recreation. Racks for parking bicycles in particular are in demand at sporting events including triathlons, biathlons, and bike races and tours where there is a need to park a large number of bicycles that do not have kickstands or other means to support themselves. Another common need for these types of racks is at public events such as concerts, festivals, or stadium events such as football games, where there is a need to park and secure a large number of bicycles or similar equipment in a small space and with minimal equipment. The key features that make a design viable in this market are ease of use, ease of storage and transportation, and lowest possible cost to the event hosts or organizers. Coming up with a design that achieves all of these goals is a major improvement for the industry, which currently lacks a good solution to meet these requirements. In many cases, groups are resorting to traditional means that are heavy and very difficult for volunteers to transport. A low cost lightweight solution has tremendous benefit to this application.

The foregoing examples of the related art and limitations related therewith are intended to be illustrative and not exclusive. Other limitations of the related art will become apparent to those of skill in the art upon a reading of the specification and a study of the drawings.

SUMMARY OF THE DISCLOSURE

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

Support structures for hanging equipment are disclosed. In some embodiments, the support structures can include a basic rack assembly assembled from of a number of tubes or shafts. The main tubes can be designed such that they telescope into each other, allowing a long horizontal support to be packed into a smaller unit for transport. The main tube assembly can be supported on any number of legs, which can be inserted into holes in the main tubes to support the main tube off the ground, thus providing a hanging point for supporting bicycles or similar equipment.

The main telescoping tubes can be locked together with small push button assemblies in that can be unlocked by hand. The "legs" can have end caps on either end, and may be smaller at one end so that they only slide to a predetermined distance into the main tubes. The legs may be designed to fit inside the main telescoping tubes, making for extremely compact storage of the assembly. For transportation, the legs can be secured inside the main tubes with a small cap, pin, or other means (e.g., the end of a bag that also protects the rack from abrasion). The legs can be set in from the end of the tubes, shortening the span of the main tubes (improving strength) and allowing for a bicycle or similar equipment to be supported on the end of the rack, which can provide easier access than having all equipment to the inside of the legs as is currently seen in this market.

In some embodiments, the main tube may include a series of vertical holes, through which small vertical posts can be inserted. These vertical posts can be used for supporting banners or signage for promotional or row locating purposes.

The proposed system, method and device can offer, among other advantages, an improved structure for racking devices, such as bicycles. In other embodiments, the device can provide banner and signage space. This can be accomplished in an efficient and robust manner compared to other systems. Advantageously, the proposed system, method and device can be packed into itself for a packed size and weight that are extremely lightweight. The simple design and construction means that the assembly can be produced at a low cost. These and other advantages of the present invention will become apparent to those skilled in the art upon a reading of the following descriptions and a study of the several figures of the drawings.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

Embodiments of the inventions are illustrated in the figures. However, the embodiments and figures are illustrative rather than limiting; they provide examples of the invention. As used herein, the term "embodiment" means an embodiment that serves to illustrate by way of example but not limitation.

Moreover, in the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
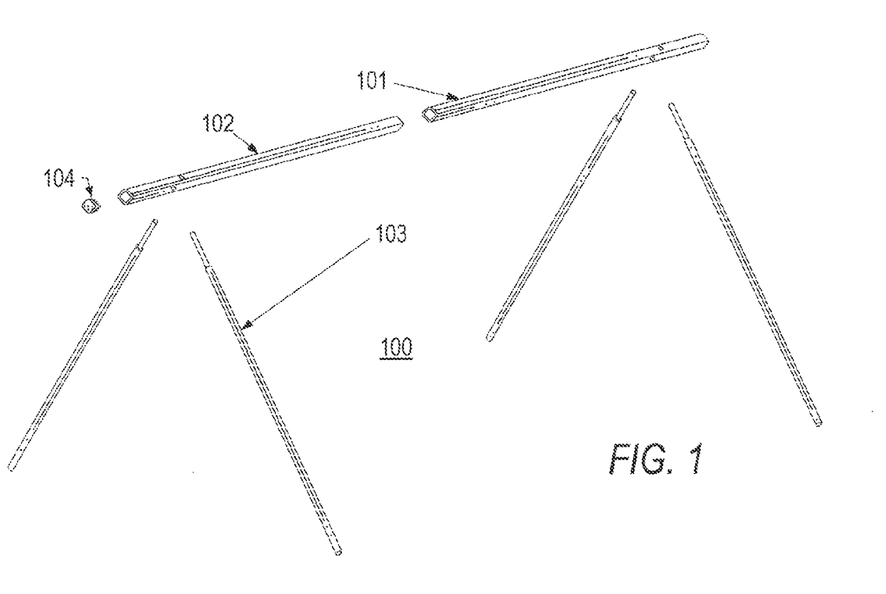
FIG. 1 shows an exploded perspective view a complete rack assembly for hanging equipment in accordance with some embodiments.

FIG. 1 shows an exploded perspective view a complete rack assembly 100 for hanging equipment in accordance with some embodiments. Complete rack assembly 100 can include a main outer tube 101, a main inner tube 102, legs 103, and a snap in plastic end cap 104. When assembled, main outer tube 101 and main inner tube 102 can serve to support hanging equipment such as bicycles, for example. One or more bicycles may be hung on main outer tube 101 and/or main inner tube 102 by any suitable feature (e.g., a seat). Main outer tube 101, main inner tube 102, and legs 103 may be formed from any suitable material (e.g., aluminum or stainless steel) capable of supporting one or more objects (e.g., bicycles) while withstanding outdoor elements such as wind and rain, for example.

Figure 2:
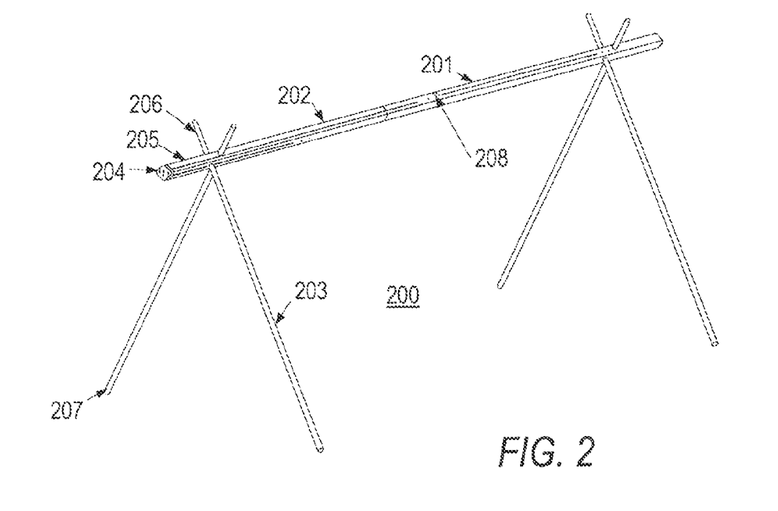
FIG. 2 shows a perspective view of a complete rack assembly in accordance with some embodiments.

FIG. 2 shows a perspective view of a complete rack assembly 200 in accordance with some embodiments. In particular, complete rack assembly 200 of FIG. 2 may correspond to an assembled view of complete rack assembly 100 of FIG. 1. As depicted in FIG. 2, main inner tube 202 has been slid into main outer tube 201 and are secured by a spring pin assembly 208. Legs 203 are slid into the holes in the main tubes with thinner ends 206 penetrating through the main tubes. Holes in the main tube (e.g., holes 202 and 205) can allow for installation of vertical posts for signs and banners. The bottom of the legs may include end caps 207 to ensure that the posts don't slide on pavement or other smooth surfaces. Accordingly, end caps 207 may be formed from a material with a high coefficient of friction such as rubber, for example. Alternatively or additionally, complete rack assembly 200 may include larger end caps 207 to prevent legs 203 from sinking into soft soil.

Legs 203 can form any suitable angles with respect to each other, the main tubes, and a surface on which the legs rest (e.g., the ground). In some embodiments, consecutively placed legs 203 may form 90° angles with respect to each other such that the legs form 45° angles with respect to a normal to the surface. In other embodiments, legs 203 may form any suitable obtuse angle (e.g., 120°) or acute angle (e.g., 60°) with respect to each other.

Figure 3:
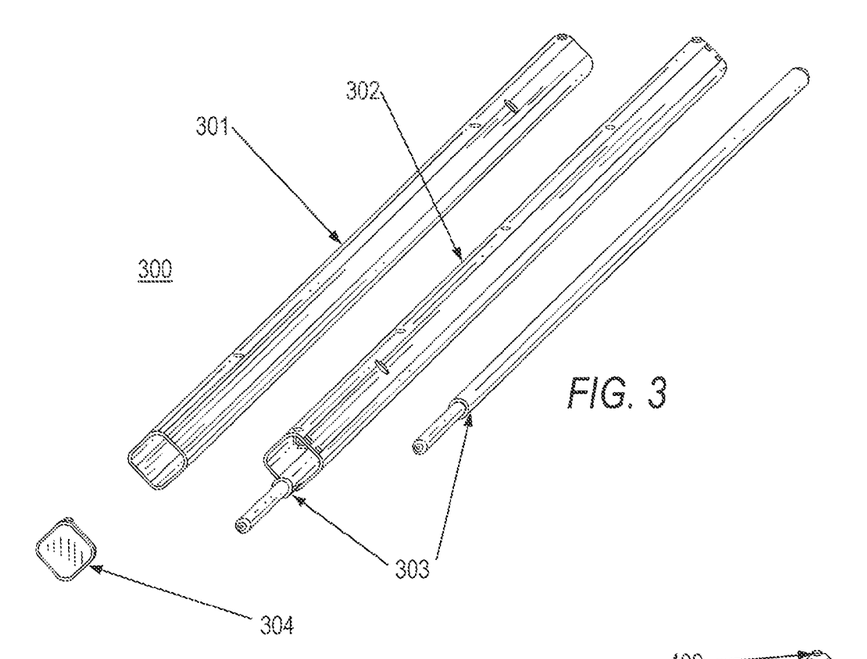
FIG. 3 shows an exploded perspective view of a packaged rack assembly in accordance with some embodiments.

FIG. 3 shows an exploded perspective view of a packaged rack assembly 300 in accordance with some embodiments. Packaged rack assembly can include a main outer tube 301, a main inner tube 302, legs 303, and an end cap 304, which may correspond to similar features of complete rack assembly 200 of FIG. 2, for example. Main outer tube 301 may have cross-sectional dimensions large enough to fully hold all components of packaged rack assembly 300. Thus, main inner tube 302 and legs 303 can be slid into main outer tube 301 for storage and transportation. End cap 304 may be used to close off the ends of main outer tube 301 to retain main inner tube 302 and legs 303 (and any other suitable system components such as end caps 207 of FIG. 2, for example) within the confines of main outer tube 301.

Figure 4:
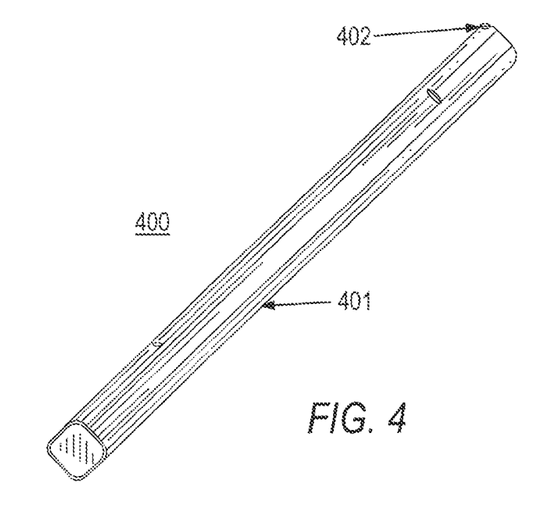
FIG. 4 shows perspective assembled view of a complete packaged rack assembly in accordance with some embodiments.

FIG. 4 shows a perspective assembled view of a complete packaged rack assembly 400 in accordance with some embodiments. Here the main inner tube and legs (e.g., main inner tube 302 and legs 303 of FIG. 3) have been slid into main outer tube 401. When fully assembled, a spring button 402 can protrude through a mating hole of main outer tube 401 to keep the main inner tube locked to main outer tube 401.

Figures 5, 6:
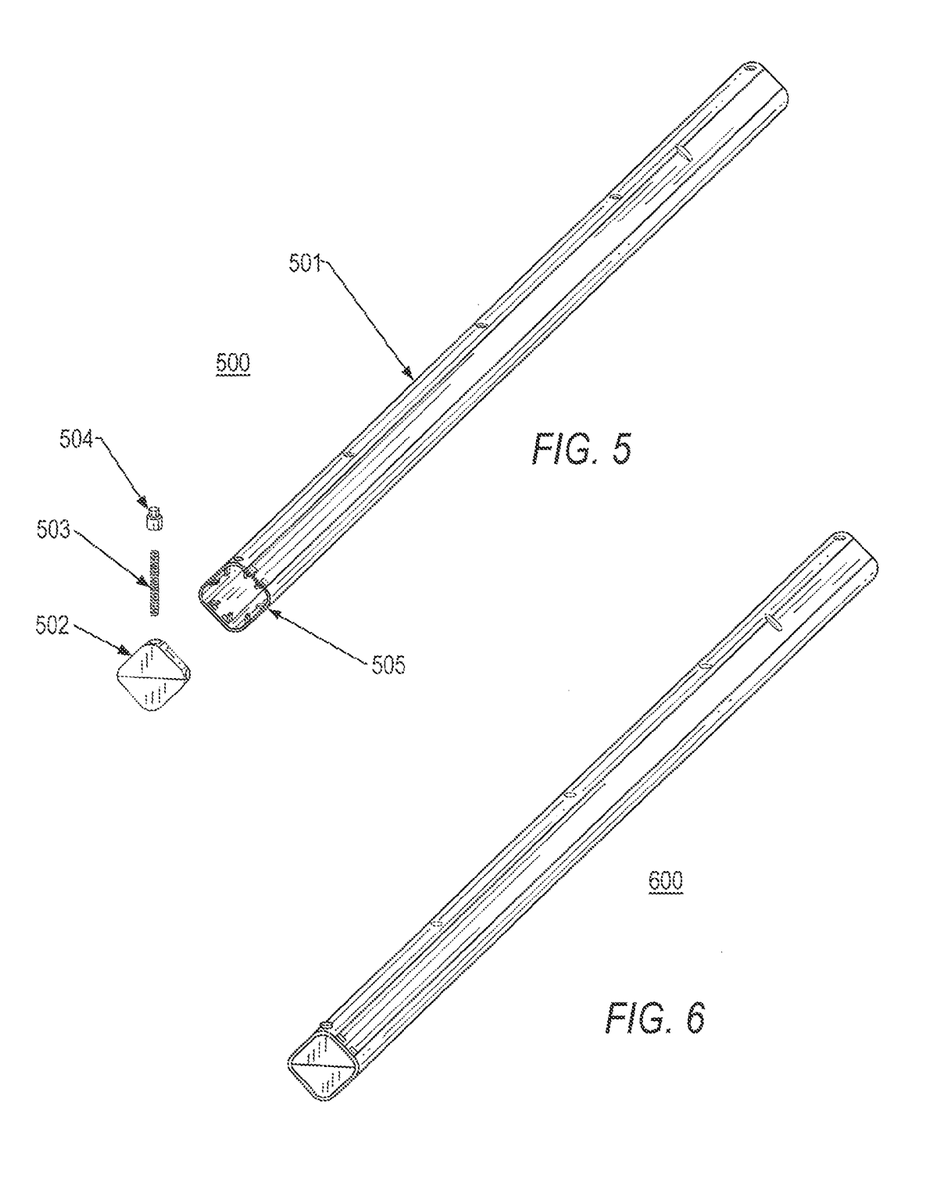
FIG. 5 shows an exploded perspective view of a complete inner tube assembly in accordance with some embodiments.
FIG. 6 an assembled perspective view of a complete inner tube assembly in accordance with some embodiments.

FIG. 5 shows an exploded perspective view of a complete inner tube assembly 500 in accordance with some embodiments. Complete inner tube assembly 500 can include a main inner tube 501, a spring button housing 502, a spring button spring 503, a spring button 504, and metal tabs 505. Spring button housing 502 can be pre-loaded with spring button spring 503 and spring button 504 prior to being inserted into the end of main inner tube 502. Spring button housing 502, spring button spring 503, and spring button 504 can be coupled to the end of main inner tube 502 using bent-in metal tabs 505. Any other suitable method for fastening spring button housing 502, spring button spring 503, and spring button 504 to the end of main inner tube 501 (e.g., using press fitting, spring buttons, or bolts) may also be employed.

FIG. 6 an assembled perspective view of a complete inner tube assembly 600 in accordance with some embodiments. In particular, complete inner tube housing 600 may correspond to complete inner tube assembly 500 of FIG. 5 with a button assembly (e.g., spring button housing 502, spring button spring 503, and spring button 504 of FIG. 6) secured in the end of the tube.

Figures 7, 8:
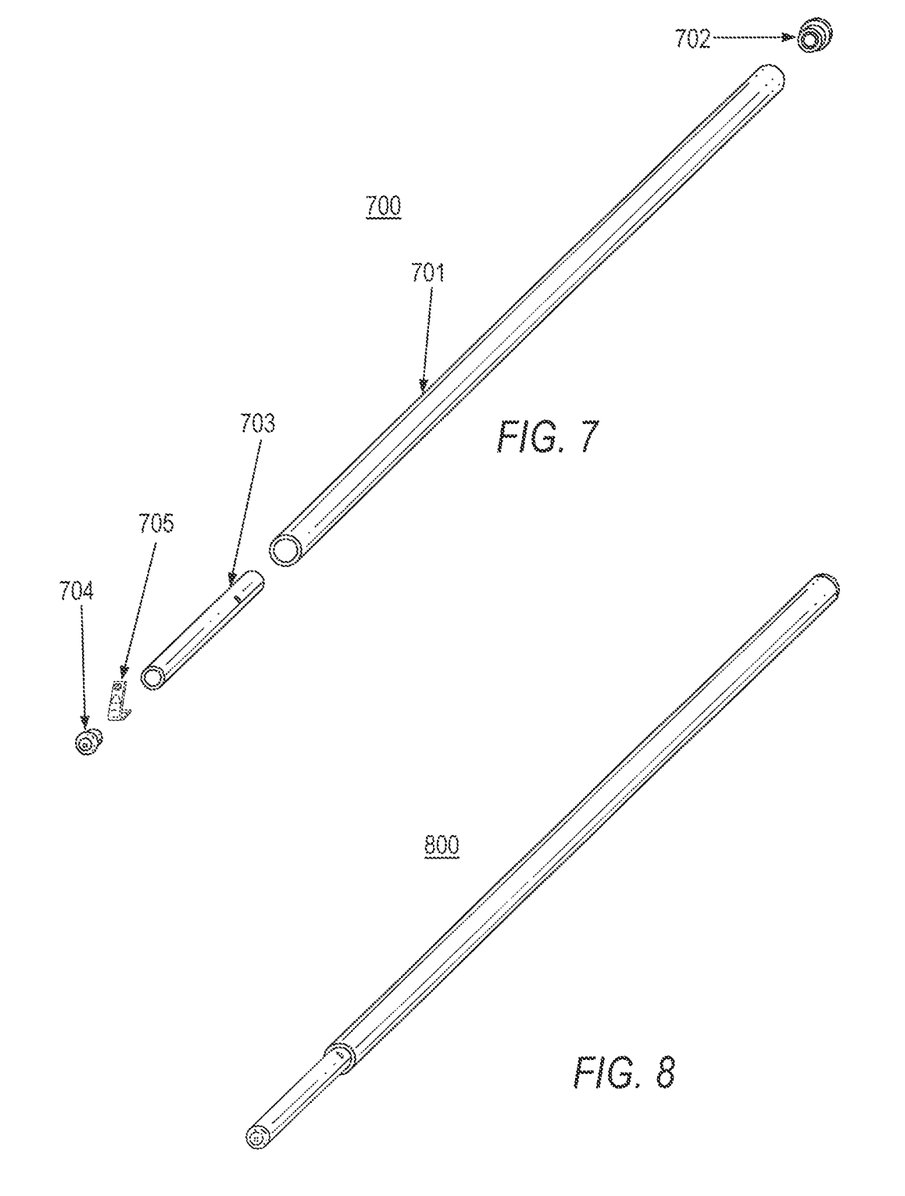
FIG. 7 shows an exploded perspective view of a complete leg assembly in accordance with some embodiments.
FIG. 8 shows assembled perspective view of a complete leg assembly 800 in accordance with some embodiments.

FIG. 7 shows an exploded perspective view of a complete leg assembly 700 in accordance with some embodiments. Complete leg assembly 700 can include leg 701, end cap 702, smaller-diameter tube 703, end plug 704, and spring button 705. Rubber, plastic, or metal end cap 702 may be press fit into one end of leg 701. Smaller diameter tube 703 may be pressed into a second end of leg 701 and secured with a smaller plastic, rubber, or metal end plug 704.

An example of a spring button 705 for leg retention is also depicted in FIG. 7. In these embodiments, spring button 705 may include two small buttons with a spring between them. The spring of spring button 705 can provide some resistance during installation and removal of the leg 701. In some embodiments, a protrusion of spring button 705 can extend through mating holes of leg 701 and smaller diameter tube 703. Thus, spring button 705 can be used to removably couple leg 701 to smaller diameter tube 703 prior to inserting complete leg assembly into a hole in a main tube of a complete rack assembly (e.g., main outer tube 101 of complete rack assembly 100 of FIG. 1). In some embodiments, spring button 705 may also serve to secure complete leg assembly 700 within the main tube of the rack assembly.

Smaller diameter tube 703 may have a cross-sectional diameter small enough to enter through the hole of the main tube while the cross-sectional diameter of leg 701 may be too large to enter the hole. Accordingly, one or more main tubes can be supported on one or more complete leg assemblies 700 as complete leg assemblies 700 may not be permitted to fully pass through the main tube(s).

FIG. 8 shows an assembled perspective view of a complete leg assembly 800 in accordance with some embodiments. In particular, complete leg assembly 800 may correspond to complete leg assembly 700 of FIG. 7. Alternatively, complete leg assembly 800 could be formed from a single tube which is swaged to a narrower diameter at one end. A push button or clip may be added to the narrower tube section to secure the legs in the main tubes once installed.

Figures 9, 10:
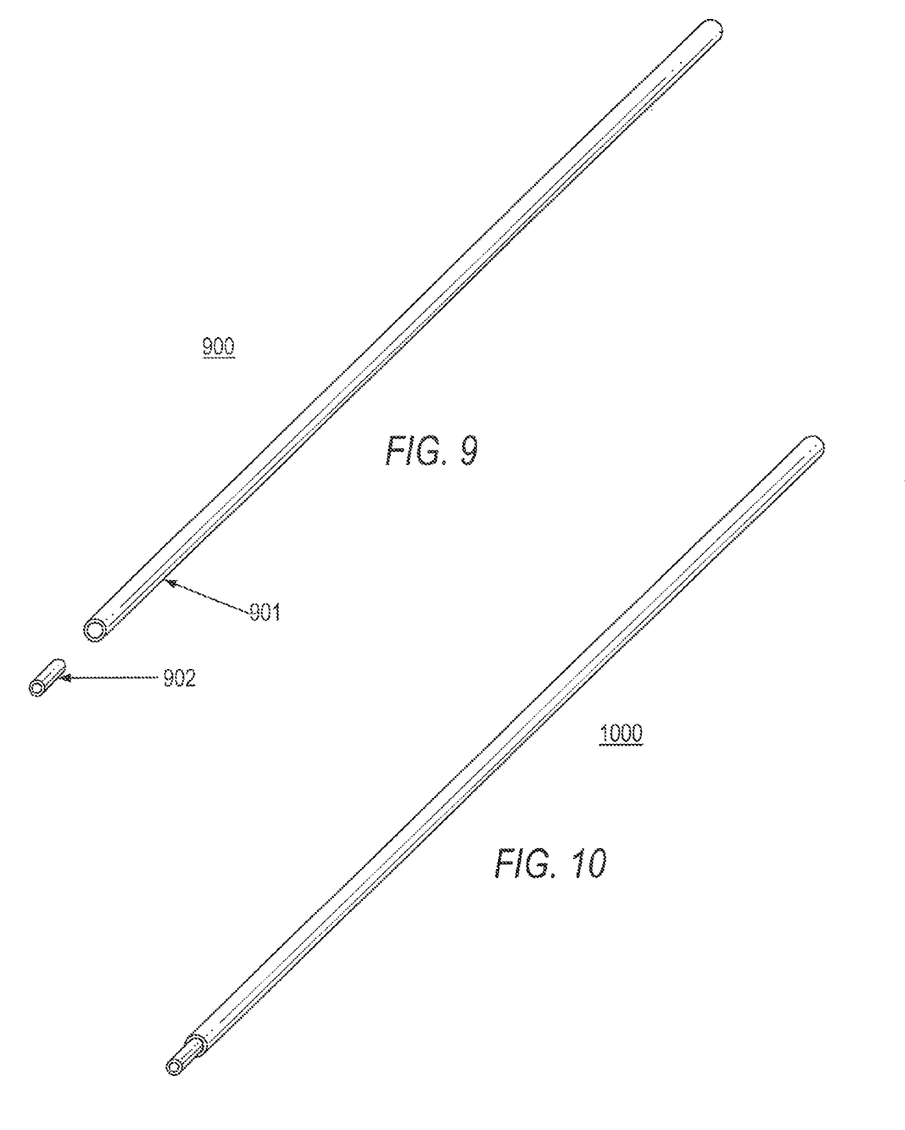
FIG. 9 shows an exploded perspective view of a mast assembly in accordance with some embodiments.
FIG. 10 shows an assembled perspective view of a mast assembly 1000 in accordance with some embodiments.

FIG. 9 shows an exploded perspective view of a mast assembly 900 in accordance with some embodiments. It consists or a main mast tube 901 and a mast tube insert 902. Mast assembly 900 may be coupled to a main tube (e.g., main outer tube 201 of FIG. 2) by inserting mast assembly 900 into holes formed in the main tube (e.g., holes 202 and 205 of FIG. 2). In some embodiments, mast tube insert 902 may have a small enough cross-sectional area to enter the holes while the cross-sectional area of main mast tube 901 is too large to enter the holes.

FIG. 10 shows an assembled perspective view of a mast assembly 1000 in accordance with some embodiments. In particular, mast assembly 1000 depicts mast assembly 900 of FIG. 9, except that mast tube insert 901 has been pressed into main mast tube 901. In alternative embodiments, mast assembly 1000 could be formed from a single tube which is swaged to a narrower diameter at one end.

Figure 11:
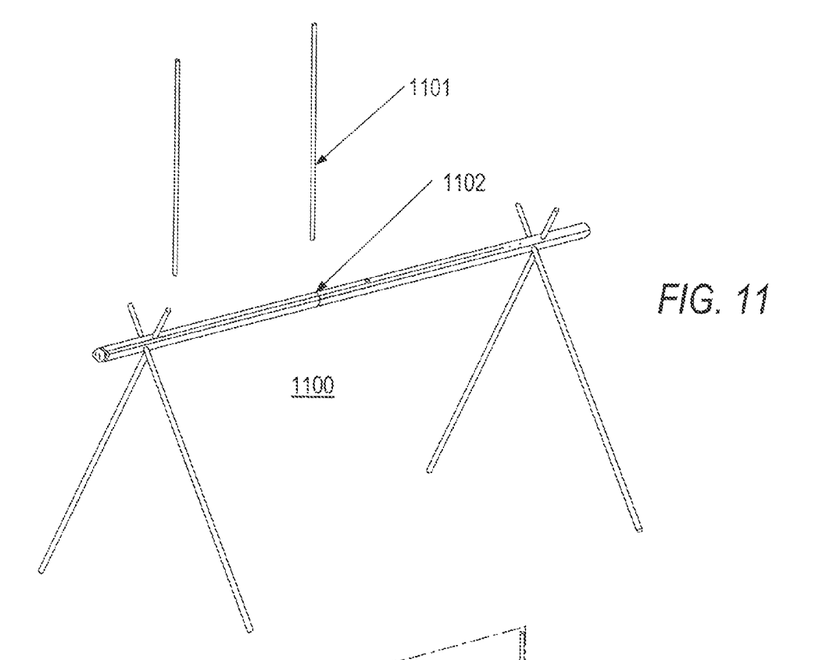
FIG. 11 shows an exploded perspective view of a complete rack assembly with masts assemblies in accordance with some embodiments.

FIG. 11 shows an exploded perspective view of a complete rack assembly 1100 with masts assemblies 1101 in accordance with some embodiments. Mast assemblies 1101 can be slid into the receiving holes, which may correspond to holes 202 and 205 of FIG. 2, for example, on the main tube 1102 complete rack assembly 1100.

Figure 12:
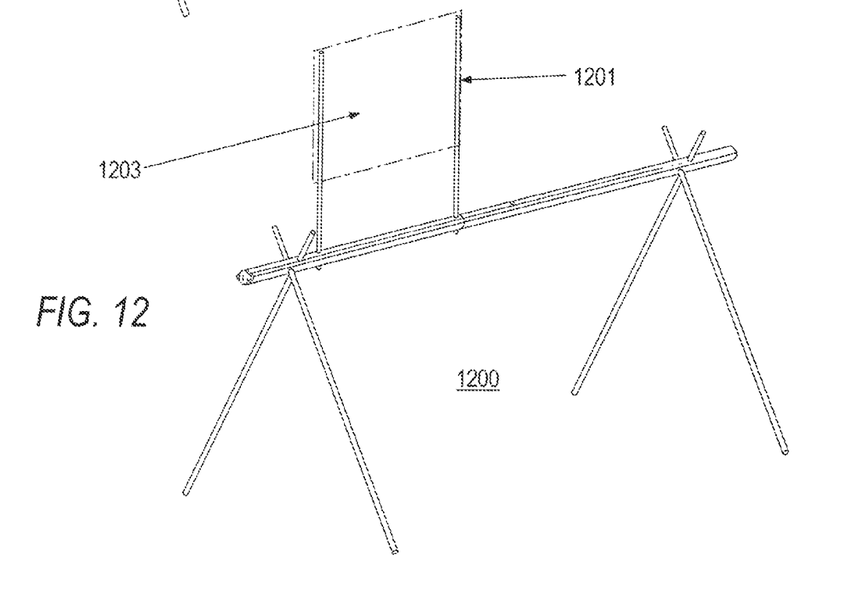
FIG. 12 shows an assembled perspective view of a complete rack assembly 1200 with masts 1201 and a sign 1203 in place in accordance with some embodiments.

FIG. 12 shows an assembled perspective view of a complete rack assembly 1200 with masts 1201 and a sign 1203 in place in accordance with some embodiments. Sign 1203 could be formed from any number of materials including cardboard, foamboard, vinyl fabric, or other fabric materials.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention.

What is claimed is:

1. An equipment racking system comprising:
    a main tube comprising a plurality of pairs of leg-receiving holes, the plurality of pairs of leg-receiving holes being offset from one another in a longitudinal axis of the main tube; and
    a plurality of legs, each leg of the plurality of legs comprising a narrow end slidable into any pair of the plurality of pairs of leg-receiving holes so as to protrude through the main tube, and the plurality of legs being oriented at angles that support the main tube horizontally above a surface when the narrow ends of the plurality of legs are slid into corresponding pairs of the plurality of pairs of leg-receiving holes, wherein each narrow end of the plurality of legs is securable to any pair of the plurality of pairs of leg-receiving holes by use of one of a push button and a clip.

2. The equipment racking system as claimed in claim 1, wherein the main tube is a single tube.

3. The equipment racking system as claimed in claim 1, wherein, in a packaged configuration, the plurality of legs is stored fully within the main tube.

4. The equipment racking system as claimed in claim 1, wherein the plurality of pairs of leg-receiving holes is positioned away from ends of the main tube such that, when the narrow ends of the plurality of legs are slid into corresponding pairs of the plurality of pairs of leg-receiving holes, at least a portion of the main tube is cantilevered.

5. The equipment racking system as claimed in claim 1, wherein the plurality of legs is securable inside the main tube by use of a snap in end cap.

6. An equipment racking system comprising:
    a main tube comprising a plurality of pairs of leg-receiving holes, the plurality of pairs of leg-receiving holes being offset from one another in a longitudinal axis of the main tube;
    a plurality of legs, each leg of the plurality of legs comprising a narrow end slidable into any pair of the plurality of pairs of leg-receiving holes so as to protrude thorough the main tube, and the plurality of legs being oriented at angles that support the main tube horizontally above a surface when the narrow ends of the plurality of legs are slid into corresponding pairs of the plurality of pairs of leg-receiving holes; and
    a spring button assembly comprising:
        a spring button housing;
        a spring button spring inserted in the spring button housing; and
        a spring button in pre-loaded communication with the spring button spring, wherein the spring button housing is coupled to an end of the main inner tube, wherein the main tube comprises an outer main tube and an inner main tube, wherein the inner main tube is lockable to the outer main tube via the spring button assembly, and wherein the main inner tube comprises a plurality of metal tabs that facilitate the coupling of the spring button housing to the main inner tube.

7. The equipment racking system as claimed in claim 1, wherein the main tube comprises vertically positioned holes for receiving vertical tubes to serve as supports for at least one of signs and banners.

8. The equipment racking system as claimed in claim 6, wherein:
    in an assembled configuration, the inner main tube is partially slid into the outer main tube and locked to the outer main tube with the spring button assembly; and
    in a packaged configuration, the inner main tube is fully slid into the outer main tube and locked to the outer main tube with the spring button assembly.

9. The equipment racking system as claimed in claim 6, wherein, in a packaged configuration:
    the main inner tube is stored fully within the main outer tube; and
    the plurality of legs is stored at least partially within the main inner tube and fully within the main outer tube.

10. The equipment racking system as claimed in claim 1, wherein the leg-receiving holes in each pair of the plurality of pairs of leg-receiving holes are aligned with one another in a direction orthogonal to the longitudinal axis.

11. The equipment racking system as claimed in claim 1, wherein first and second pairs of the plurality of pairs of leg-receiving holes are disposed proximate one end of the main tube, and wherein third and fourth pairs of the plurality of pairs of leg-receiving holes are disposed proximate the other end of the main tube.

12. The equipment racking system as claimed in claim 1, wherein the leg-receiving holes in a first pair of the plurality of pairs of leg-receiving holes are aligned with one another in a one direction orthogonal to the longitudinal axis, and wherein the leg-receiving holes in a second pair of the plurality of pairs of leg-receiving holes are aligned with one another in a different direction orthogonal to the longitudinal axis.

\* \* \* \* \*